March 10, 1936.  C. A. CAMPBELL  2,033,230
AIR BRAKE
Filed Oct. 26, 1932  3 Sheets-Sheet 1

Inventor
Charles A. Campbell
Attorneys

March 10, 1936.  C. A. CAMPBELL  2,033,230
AIR BRAKE
Filed Oct. 26, 1932   3 Sheets-Sheet 2

Inventor
Charles A. Campbell

Attorneys

March 10, 1936.　　　　C. A. CAMPBELL　　　　2,033,230
AIR BRAKE
Filed Oct. 26, 1932　　　3 Sheets-Sheet 3

Inventor
Charles A. Campbell
Attorneys

Patented Mar. 10, 1936

2,033,230

UNITED STATES PATENT OFFICE 2,033,230

AIR BRAKE

Charles A. Campbell, Watertown, N. Y., assignor to The New York Air Brake Company, a corporation of New Jersey Application October 26, 1932, Serial No. 639,708

24 Claims. (Cl. 303—35)

This invention relates to triple valves, and particularly features relating to service graduation and quick service venting and to the control of the development of brake cylinder pressure in service application.

In a prior application Serial No. 592,641, filed February 12, 1932, I disclose and claim broadly a construction in which a graduating valve and a quick service controlling valve, each of which is movable relatively to a triple slide valve, are used. In the embodiment chosen for illustration in the prior application, the quick service controlling valve was interposed between the graduating valve and slide valve.

The present application discloses and claims specifically an arrangement in which the quick service controlling valve and graduating valve are each mounted directly on the top of the triple slide valve. The arrangement is functionally somewhat similar but has operative advantages which will be apparent from the description hereinafter given.

Closely associated functionally with the slide valve and quick service controlling valve is a quick service limiting valve. The function of this valve is to limit the amount of brake pipe air discharged to atmosphere or elsewhere, in producing a service application. In a prior application Serial No. 517,606, filed February 21, 1931, this quick service limiting valve is broadly claimed. As embodied in the prior application, this limiting valve functoned to terminate quick service venting when brake pipe pressure was reduced a definite amount below a pressure which remained constant during service and which was established during the charging function of the triple valve.

While a quick service valve of the type described in my prior application might be used in conjunction with the slide valve mechanism of the present application, I disclose and claim in the present application a quick service limiting valve which is controlled by pressure in the chamber so related to the slide valve that the pressure in the chamber is readjusted when the valve moves from service to lap position. Consequently the quick service limiting valve functions to permit quick service venting in successive brake pipe reductions in a split reduction application and limits the venting in each instance so that brake pipe pressure may be reduced by such venting only a definite amount.

In a prior application, Serial No. 616,326, filed June 9, 1932, which matured into Patent No. 1,986,916, January 8, 1935, I disclose and claim broadly the use of a service build up controlling valve which normally restricts the flow of auxiliary reservoir air to the brake cylinder in service, and which is shifted by the charging of a surge chamber in lap position so as to terminate such restriction. In certain classes of service, notably on short trains, the action of this service build up limiting valve is undesirable, and one feature of the present invention is the provision of a by-pass valve responsive to the conditions which exist in short trains, and serving to by-pass the service build up limiting valve and thus render it ineffective to limit the rate of service build up. The present application is consequently directed to those embodiments and improvements herein disclosed, and the broad subject matter is reserved for the prior applications above identified.

It will be understood that the triple valve is intended for use in conjunction with an emergency brake pipe vent valve which is closely associated with the brake pipe and vents the brake pipe when brake pipe pressure is reduced at an emergency contradistinguished from a service rate. Valves of this type are well known, and it is not deemed necessary to illustrate the emergency vent valve.

Figures 1, 2:
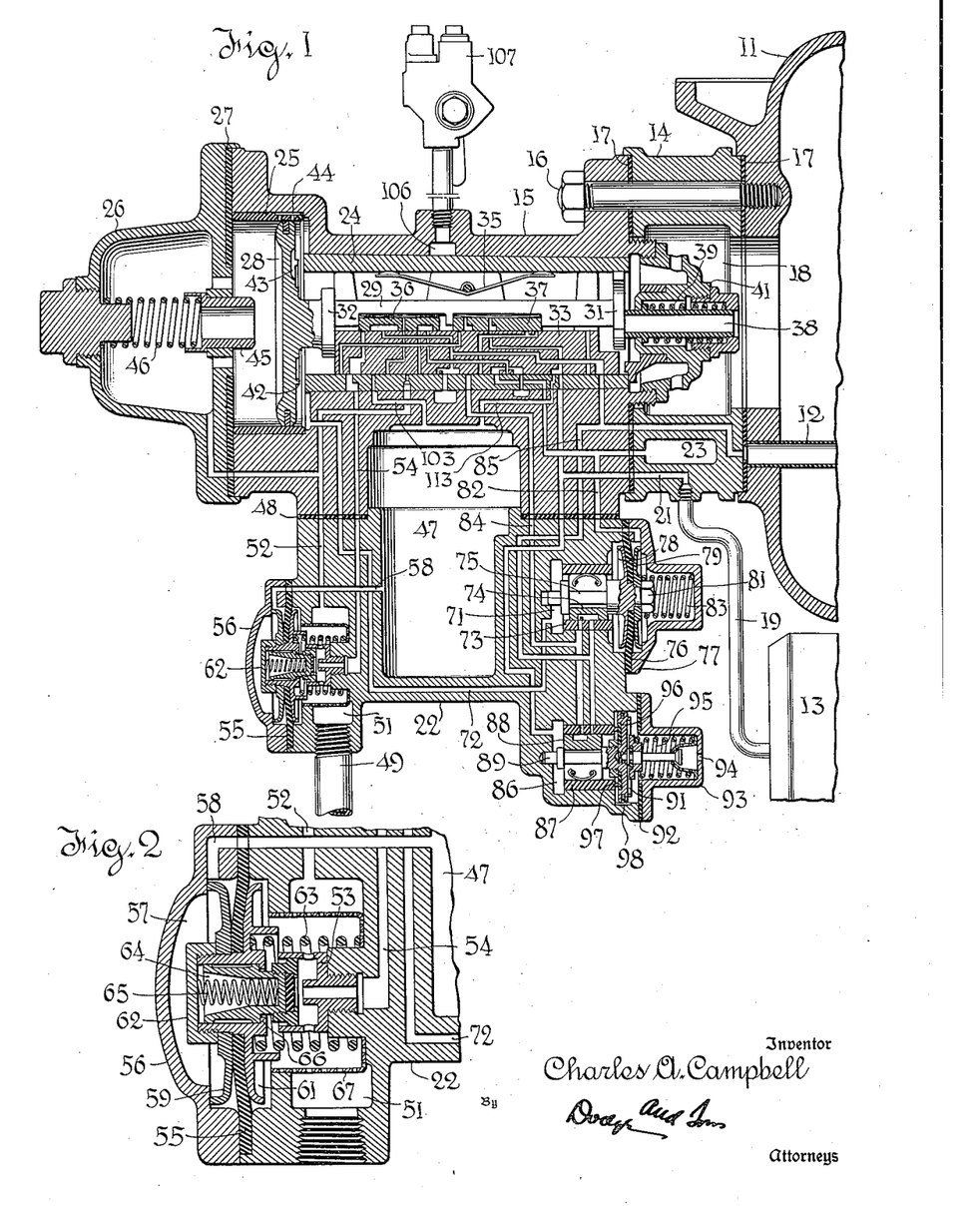
Fig. 1 is a vertical axial section through a triple valve embodying the various features above outlined. The showing is diagrammatic to the extent that the various ports are drawn as if they lay in a single plane so that their concurrent functions may readily be traced. In this view the parts are shown in normal release and recharge position.
Fig. 2 is a fragmentary section showing the quick service limiting valve on a somewhat enlarged scale.

Referring first to Fig. 1, 11 represents an ordinary auxiliary reservoir of the freight type, having a mounting face on its rear end and a brake cylinder pipe 12 which leads through the reservoir from the mounting face to the brake cylinder. The brake cylinder is mounted on the forward end of the auxiliary reservoir, as usual, and is not shown in the drawings. A supplemental reservoir 13 is used, its most important function being to supply additional air for emergency applications.

Supported on the mounting face on the head of the auxiliary reservoir 11, is a filler piece 14 and supported on the filler piece 14 is the body 15 of the triple valve. The body 15 is connected to the reservoir 11 by means of studs 16, one of which appears in the drawings. The studs 16 pass through the filler piece 14, as shown, and tight joints are secured by gaskets 17, one of which is interposed between the filler piece and the reservoir, and the other of which is interposed between the filler piece and the body 15 of the triple valve. The filler piece is formed with a through passage 18 which connects a slide valve chamber of the triple valve with the interior of the auxiliary reservoir. The filler piece has also a connection for the supplemental reservoir pipe 19 which places the supplemental reservoir 13 in communication with the supplemental reservoir passage 21 formed partly in the filler piece 14, partly in the body 15 of the triple valve, and partly in the lower case 22 which is bolted to the body 15.

Formed in the filler piece 14 is a chamber 23 of considerable volume, called the surge chamber. This is normally at atmospheric pressure when the triple valve moves to lap position. The body 15 has the usual slide valve chamber bushing 24 and the usual cylinder bushing 25, and carries the usual front cap 26. The front cap 26 is sealed to the body 15 by a gasket 27 which projects radially inward far enough to serve as the seat for the triple piston 28.

The triple piston has a stem 29 with guiding spider 31. A collar 32 is also formed on the stem 29. The spider 31 and the collar 32 actuate, with lost motion, a triple slide valve 33. The slide valve 33 coacts with a seat formed in the lower portion of the bushing 24, as usual, and is urged to its seat by the usual bow spring 35.

A quick service controlling valve 36 is mounted on the upper face of the slide valve 33 and is confined in a notch in the stem 29, as shown, the notch being long enough to afford some lost motion to the valve 36, but less lost motion than is afforded to slide valve 33. The graduating valve 37 is closely confined in a second notch in stem 29 so that it has no lost motion relatively to the stem 29.

The valves 36 and 37 are held to their seats by leaf springs clearly shown in the drawings. It should be explained that these leaf springs are so arranged that they do not blind the through ports formed in the valves 36 and 37.

The normal release and recharge position of the piston 28 and slide valve 33 is defined by yielding retard stop 38 of ordinary form. It is urged outward (to the left) by a retard stop spring 39. The stop 38 is slidable in, and the spring 39 reacts against, a guide structure 41 which is threaded to the body 15, as shown. It will be observed that the stem 38 coacts with spider 31 on the end of stem 29 and does not react against the slide valve. It arrests the stem 29 in normal release and recharge position if the spring 39 be not overpowered. If the spring 39 be overpowered, the piston 28 moves further inward until the bead 42 on piston 28 seats against the end of slide valve chamber bushing 24, at which time charging flow is restricted to the capacity of the slot 43 cut through the rim 42. Charging flow occurs through drilled ports and connecting slot formed in bushing 25 and clearly indicated at 44. Service position is defined by the collision of piston 28 with a slidable graduating stop 45. Stop 45 is sustained by a coiled compression graduating spring 46 which holds the stop 45 normally in its right hand limiting position, but it may yield to permit the piston 28 to move into sealing engagement with the gasket 27, which it does in emergency position and in over reduction position, that is, if brake pipe pressure be reduced substantially below the point of equalization of auxiliary reservoir pressure with brake cylinder pressure.

The lower case 22 is bolted to the lower side of the triple valve body 15 and has a cavity which, in conjunction with a companion cavity in body 15, forms a quick service controlling chamber 47. The lower case 22 is sealed to the body 15 by a gasket 48 and the parts are held together by bolts not visible in the drawings. Thus the chamber 47 is isolated except for certain ports which will hereinafter be described.

The brake pipe 49 is connected to the lower case 22 and communicates with a chamber 51 from which a passage 52 leads directly to the space to the left of triple piston 28. Threaded into a boss within chamber 51 is a valve seat bushing 53 through which, if open, flow may occur to the quick service passage 54. Mounted upon a seat on the left hand face of the lower case 22 is a flexible diaphragm 55 which is clamped and sealed at its periphery by a cap 56 which encloses a chamber 57 on the outer or left hand side of the diaphragm. The chamber 57 is connected by a passage 58 with the chamber 47. Clamped through the central portion of the diaphragm 55 is a hub structure made up of two concavo-convex disks 59 and 61, the disk 61 having a central hub portion which extends through the disk 59 and receives a clamping cap nut 62. A spring 63 urges the diaphragm to the left and the peripheral flange portions of the disks 59 and 61 coact with the cap 56 and portions of the lower case 22 to limit the movements of the diaphragm.

Slidably mounted in the hub structure at the center of diaphragm 55 is a valve 64 which is urged outward (to the right) by a coil compression spring 65 and which is limited in its outward motion by a stop flange 66. It will be observed that the diaphragm 55 is urged to the left by brake pipe pressure and by the spring 63, and is urged to the right by the pressure in quick service control chamber 47. It follows that when brake pipe pressure is reduced below the pressure in the chamber 47 by an amount determined by the strength of spring 63, the valve 64 will close against the seat 53 and terminate quick service flow.

The member 67 in the drawings is merely an annular screen or strainer. Formed in the lower case 22 is a slide valve chamber 71 which is connected by a passage 72 with the slide valve chamber in which the triple valve is mounted, and consequently is always at auxiliary reservoir pressure. Mounted in this chamber is a slide valve chamber bushing 73 in which works a slide valve 74 closely confined in a notch in stem 75. Stem 75 is actuated by a flexible diaphragm 76 which is clamped at its periphery between the lower case 22 and a cap 77 bolted to the lower case. The stem 75 is provided with a cup-like flange 78 and receives a companion cup-like flange 79 between which the middle portion of the diaphragm is clamped. A nut 81 screwed on to the outer end of stem 75 exerts clamping pressure and the peripheral portions of the cup-like members 78, 79, serve as limit stops.

The diaphagm 76 is subject on its left hand side to auxiliary reservoir pressure and on its right hand side is subject to the pressure in the surge chamber 23, which is connected by way of passage 82. A loading sping 83 urges the stem 75 inward to the left, so that if the pressure in the surge chamber 23 is equal to auxiliary reservoir pressure, the stem 75 will shift the valve 74 to the left.

Formed in the seat for the valve 74 are two ports, one of which communicates with passage 84, which, as will be explained, leads to the service seat port for the triple slide valve. The other communicates with port 85 which leads directly to the brake cylinder pipe 12. The valve 74 is formed with a recess having a slender extension or restricting port, clearly shown in Fig. 1, and so formed that when valve 74 is to the right, the passages 84 and 85 are in restricted communication with each other, and when the valve 74 is moved inward to the left, the passages 84 and 85 are in free communication with each other.

Parts 71 to 85 conform to the construction disclosed in my prior application above identified.

Adjacent the slide valve chamber 71 is a second slide valve chamber 86 which is connected directly with passage 21 and consequently with the supplemental reservoir. Chamber 86 is provided with a slide valve chamber bushing 87 having two ports which communicate with passages 84 and 85. Working in the bushing 87 is a slide valve 88 formed with a recess coacting with the ports just mentioned, and so arranged that when the slide valve 88 is in its inner left hand position the ports are disconnected and when in its outer right hand position are freely connected. Thus, when valve 88 is to the left, the valve 74 can control, but when the valve 88 is to the right, the ports 84 and 85 are freely connected and the throttling action of valve 74 is rendered ineffective.

The valve 88 is confined between shoulders on the piston stem 89 connected to piston 91. Piston 91 works in a cylinder and when forced outward seats against a gasket 92 which is interposed between the lower case 22 and a cap 93. The cap 93 has an atmospheric vent port 94 so that the outer side of the piston is subject to atmospheric pressure. The spring 95 urges the piston inward and when in its innermost position, as shown in the drawings, a gasket 96 on the inner face of the piston seats on a rim 97 formed on the outer end of bushing 87. Thus the piston is tightly sealed in both its limiting positions. Further, if the piston 91 starts to move outward against the resistance of spring 95, it moves out of sealing engagement with rim 97 and immediately exposes an increased area to supplemental reservoir pressure. A groove 98 formed in the cylinder wall acts to vent the area outside of the rim 97 until the piston starts to the right. Initial motion of the piston closes the groove 98. The strength of the spring 95 is so chosen as to determine the position of piston 91 and valve 88 according to the brake pipe pressure used. When freight cars are connected in long freight trains a relatively low brake pipe pressure, say 70 pounds, is used, and when they are connected in short trains for fast service, a higher brake pipe pressure, say 90 pounds or more, is used.

When the lower brake pipe pressure is used, the spring 95 overpowers supplemental reservoir pressure which corresponds with normal brake pipe pressure, and valve 74 is permitted to control the build up of brake cylinder pressure. In short train service supplemental reservoir pressure, which, of course, corresponds to normal brake pipe pressure, will overpower spring 95, and valve 88 will be shifted to prevent valve 74 from affecting the build up of brake cylinder pressure.

Turning now to Figs. 3 to 7 inclusive, the porting of the slide valve, quick service controlling valve, and graduating valve will be explained.

The quick service passage 54 leads to a quick service port 101 in the slide valve seat. A pressure modifying port 102 is connected by passage 103 with the quick service control chamber 47. The brake pipe surge port 104 is connected directly with an extension of passage 52. An exhaust port 105 leads to a passage 106 which extends around the valve chamber bushing 26 and thence discharges to atmosphere through a retainer 107, of conventional form. A service port 108 communicates with passage 84. A surge chamber port 109 communicates with a branch of passage 82, and, consequently with the surge chamber 23. An independent exhaust port 111 leads directly to atmosphere and is not controlled by the retainer. A charging port 112 for quick service control chamber 47 is connected to that chamber by passage 113. Supplemental reservoir port 114 is connected to a branch of passage 21. An emergency brake cylinder port 115 communicates with a branch of passage 85 and consequently leads directly to the brake cylinder pipe 12.

Figure 3:
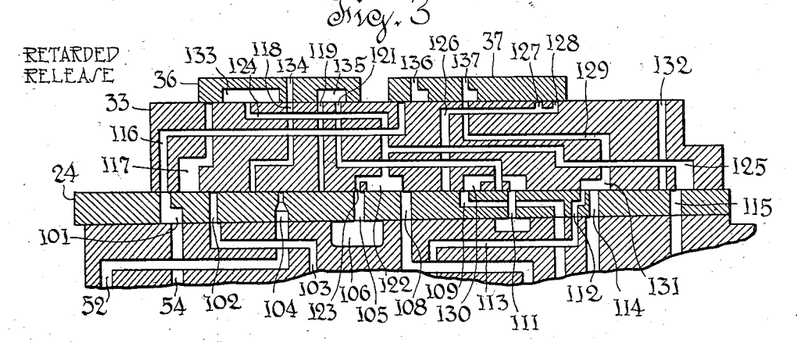
Fig. 3 is a fragmentary view of the slide valve, quick service controlling valve, and graduating valve, drawn on an enlarged scale and showing the positions assumed in retarded release and restricted recharge position.
Figure 4:
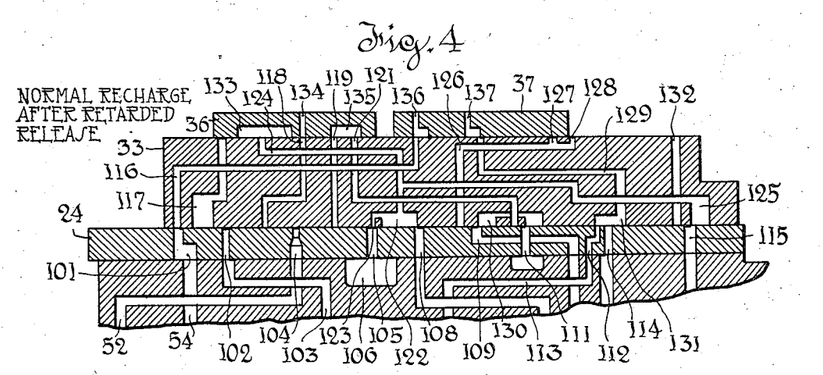
Fig. 4 is a similar view showing the parts in the position of normal recharge after retarded release.

A stabilizing port 116 extends through the slide valve from bottom to top. It registers with port 101 in retarded release position and in normal recharge position after retarded release.

Figure 5:
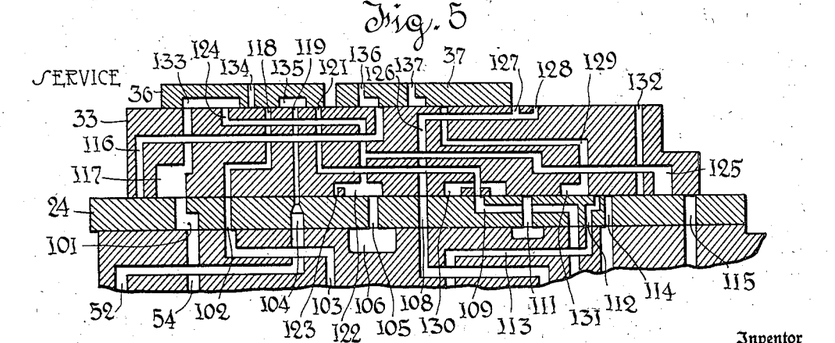
Fig. 5 is a similar view showing the parts in service position.
Figure 6:
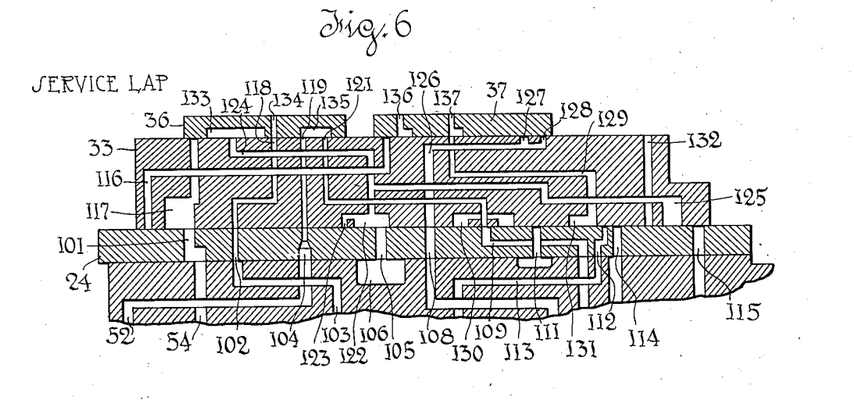
Fig. 6 is a similar view showing the parts in service lap position.
Figure 7:
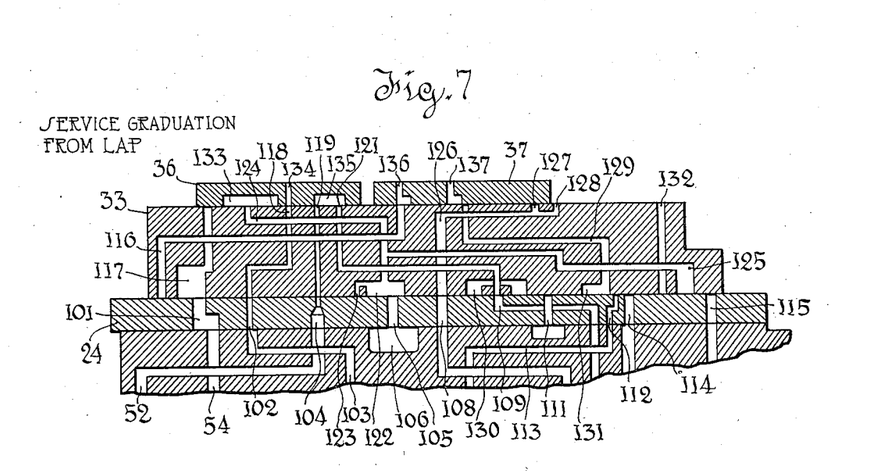
Fig. 7 is a similar view showing the parts in the position assumed during a service graduation from lap position.

There is a quick service port 117 which in service position, service lap position and in the position of service graduation after lap registers with port 101. It is enlarged at its lower end so as to maintain registration through a substantial motion of the valve 33. There is a through port 118 which registers with port 102 in service, service lap, and service graduation after lap positions. There is a through port 119 which registers with port 104 in service, service lap and service graduation after lap positions. There is a through port 121 which registers with the surge chamber port 109 in service, service lap and service graduation after lap positions. There is an exhaust cavity 122 which has a restricted extension 123 which communicates freely with the exhaust port 105 in normal release, service, service lap, and service graduation after lap positions, and communicates with exhaust port through the restriction 123 in retarded release and in normal recharge after retarded release positions.

Leading from the cavity 122 is a branch 124 which terminates on the upper face of the slide valve 33, and a branch 125 which terminates on the lower face of slide valve 33 and which in all release positions registers with the brake cylinder port 115. There is a through port 126 which leads from the lower face of the slide valve and terminates in the upper face in two openings, a main service opening 127 and a restricted service opening 128. The port 126 registers with the port 108 in service, service lap and service graduation after lap positions.

In the lower face of valve 33 is a cavity 130 which in all release positions connects the ports 109 and 111.

There is a through port 129 which extends from the top to the bottom of slide valve 33 and terminates in the lower face in an enlargement or cavity 131. Cavity 131 registers with the ports 112, 114 in all release positions and is the means for charging the supplemental reservoir and the quick service control chamber. There is a through port 132 which registers with supplemental reservoir port 114 in emergency position (which position is also assumed on overreduction of brake pipe pressure). At such time the brake cylinder port 115 is exposed by the slide valve 33 so that in emergency and overreduction positions, air from the supplemental reservoir and the auxiliary reservoir flows freely to the brake cylinder.

The quick service controlling valve 36 has in its lower face a cavity 133 which in service position (Fig. 5) connects ports 117 and 124 so that quick service flow may occur. It has no other function. In the valve 36 there is also a through port 134 which functions in service lap and in service graduation after lap by registering with the port 118, which at that time is in register with the port 102. The effect is to establish in chamber 47 a pressure equal to auxiliary reservoir pressure. The port has no other function.

In the lower face of the valve 36 there is a second cavity 135, which functions in service lap and in service graduation after lap position to connect the ports 119 and 121 so that as the triple valve moves to lap position the brake pipe is vented into the surge chamber. This has a twofold effect. It slightly dampens the rise of brake pipe pressure so that the triple valve has no tendency to overtravel toward release position, and it charges the surge chamber 23 so that the valve 74 will be shifted to its non-restricting position.

The graduating valve 37 has a through port 136 which is longitudinally enlarged on the lower face of the valve 37. This port functions in normal recharge after restricted release, and in initial motion from this position toward service to establish a stabilizing connection between the brake pipe and the auxiliary reservoir. The port 136 has no other function.

There is a second through port 137 which is formed in valve 37 and which also has a longitudinal extension on the lower face of the valve. This port functions in all release positions to expose the upper end of the port 129 and permit charging flow to the supplemental reservoir 13 and to the quick service control chamber 47. The right hand or inner edge of the valve 37 also controls the service ports 127 and 128 at the upper end of the port 126.

The port 126 registers with service port 108 in service, service lap and service graduation after lap positions. In service position the valve 37 exposes both of the ports 127 and 128. In lap position it blanks both of said ports, and in service graduation after lap position it exposes only the port 128 (see Fig. 7). As this is a relatively restricted port, slow flow to the brake cylinder occurs. This flow is sufficient to reduce auxiliary reservoir pressure as fast as brake pipe pressure would be reduced by leakage. Since the valve 37 moves with the stem 29, and since the valve 36 has some lost motion, the port 128 is exposed at a time when cavity 133 does not connect ports 117 and 124. Consequently flow through port 128 can occur before any quick service venting can take place, and the flow through port 128 reduces auxiliary reservoir pressure at a rate sufficiently great to insure that the valve will not creep to quick service position.

The operation of the device is as follows:

*Normal recharge (Fig. 1)*

Air from the brake pipe flows around the edge of the triple piston and flows through the slide valve chamber directly to the auxiliary reservoir. At the same time the supplemental reservoir is charged by way of ports 137, 129, 131 and 114. Part of the flow branches off from port 131 through port 112 to the quick service control chamber. The brake cylinder is freely exhausted by way of ports 115, 125, cavity 122, port 105. The surge chamber 23 is exhausted to atmosphere by way of ports 109, cavity 130 and independent exhaust port 111.

*Retarded release (Fig. 3)*

At the forward end of the train rapid rise of brake pipe pressure will cause piston 28 to overpower retard stop spring 39 and the parts will shift to the position shown in Fig. 3. In this position the charging rate past piston 28 is reduced to the capacity of groove 43, and the charging flow through port 129 to supplemental reservoir 13 and chamber 47 is not affected because of the extension port 131. The surge chamber 23 remains freely connected to atmosphere through ports 109, 130 and 111, and the exhaust flow from the brake cylinder must take place through the restriction 123 so that release is retarded.

*Normal recharge after retarded release (Fig. 4)*

Ultimately the retard spring 39 will shift the piston 28 outward, or to the left. Such motion does not affect either the slide valve 33 or the quick service controlling valve 36, but does shift the graduating valve 37 sufficiently to cause port 136 to register with port 116 and establish a stabilizing connection between the brake pipe and the auxiliary reservoir. The effect of this is to render those valves which have moved to retarded release less sensitive to brake pipe reductions than they otherwise would be, and this function is broadly claimed in certain of my prior applications above identified. Motion of the piston restores the charging rate from the brake pipe to the slide valve chamber, but since the slide valve remains at rest the restriction of brake cylinder exhaust persists until exhaust is completed.

*Service (Fig. 5)*

Service reduction of brake pipe pressure causes the piston 28 to move outward until arrested by engagement with graduating stop 45. The valve parts assume the position shown in Fig. 5. Such motion is assisted by the establishment of a quick service flow connection by way of ports 101, 117, 133, 124, cavity 122, to exhaust port 105. This quick service venting flow, it will be observed, will be stifled by the retainer 107, if the latter is active.

Quick service flow speeds up service action and accelerates the propagation of service reduction of brake pipe pressure. In service position the port 112 is blanked by the slide valve 33 and the port 118 is blanked at the quick service control valve 36. Consequently, chamber 47 is isolated.

and when brake pipe pressure falls a definite amount (determined by the strength of spring 63) below the pressure in chamber 47, valve 64 will close and terminate quick service flow. The connection with the surge chamber 23 is cut off by valve 36. Service ports 127, 128 are exposed by the valve 37, and flow occurs through ports 126 and 108, passage 84, through the throttling restriction of valve 74, passage 85 and thence to the brake cylinder pipe 12. Consequently service flow on initial reduction is quite slow and auxiliary reservoir pressure will fall with corresponding slowness.

*Service lap (Fig. 6)*

Ultimately, however, auxiliary reservoir pressure will fall slightly below brake pipe pressure, and the piston will shift graduating valve 37 and then the quick service control valve 36 inward to the right. Motion of the valve 37 closes first the port 127 which slows up the rate of auxiliary reservoir pressure fall and then the port 128. Motion of the valve 36 will connect the ports 119 and 121 which then register with ports 104 and 109, permitting brake pipe air to flow to the surge chamber before valve 37 closes port 128. Charging of the surge chamber will result in the shifting of valve 74 to its non-restricting position. The shifting of the valve 36 will also cause port 134 to register with port 118 after port 117 has been closed and port 121 has been opened, port 118 then being in register with port 102. The effect is therefore to reduce the pressure in the quick service control chamber 47 to equalize with auxiliary reservoir pressure, and consequently approximately to equalize with brake pipe pressure.

*Service graduation after lap (Fig. 7)*

If now the piston 28 should start to creep outward, as a result of a very slow reduction of brake pipe pressure, such, for example, as that occasioned by leakage, the only effect would be to open port 128 and permit auxiliary reservoir pressure to fall at a commensurate rate. This prevents the valve from creeping into quick service position because valve 37 opens port 128 before cavity 133 bridges ports 117 and 124. However, if the engineer makes a second reduction, as he would do in a split reduction service application, piston 28 would move outward far enough to expose both the ports 127 and 128 and to blank port 118. Since the pressure in chamber 47 had been lowered to equalize with auxiliary reservoir, at the completion of the first service graduation, the quick service limiting valve 64 will be opened and permit a second quick service reduction which will allow brake pipe pressure to fall a definite amount below the newly established pressure in chamber 47. Thus the quick service limiting valve permits service venting to occur but imposes a definite limitation on each recurrent reduction. It is reset every time the valve moves to lap position. Since the surge chamber 23 is charged in lap position, the valve 74 has shifted to its non-restricting position. Consequently service flow to the brake cylinder is restricted only on the first reduction, free flow being permitted in all subsequent reductions.

*Function of by-pass valve 88*

The by-pass valve 88 does not function on any train in which a relatively low brake pipe pressure is used, but if the car so equipped be coupled in a short train in which a high brake pipe pressure is used, valve 88 will be shifted and will render the service build up delay valve 74 ineffective. Thus on short trains the brake cylinder pressure will build up rapidly in the first service reduction. This is a desirable condition for the reason that delay build up is needed only on long trains to counteract the effect of a tapered brake pipe pressure which results from leakage.

While the various features above described operate in conjunction with each other to produce a very satisfactory operation, certain features of the invention are separately applicable and not limited to use in the complete combination or for use in the specific form illustrated.

No emphasis has been placed on the emergency function of the valve. It may be stated that upon complete traverse of the piston 28 to the left, supplemental reservoir port 114 connects through port 132 with the slide valve chamber while the brake cylinder port 115 is exposed to the slide valve chamber by motion of the valve 33. This permits immediate rapid flow from both of the reservoirs to the brake cylinder. It has heretofore been proposed to interpose in the path of such emergency flow, a mechanism which will control the rate of brake cylinder pressure build up in emergency. Since emergency flow through the port 115 follows a path distinct from service flow which occurs through the port 108, it is perfectly feasible to interpose in the path of air flowing through the port 115 any desired mechanism to control the rate of emergency build up flow. While the present invention is not concerned with the use of such a mechanism, I wish expressely to point out that there is nothing in the construction to preclude such use, if desired.

What is claimed is,—

1. A triple valve including a triple piston; a slide valve; a quick service controlling valve coacting with the slide valve; and a graduating valve coacting with the slide valve, said valves being relatively shiftable by said piston with differential motion, said slide valve having a quick service passage which is opened and closed by the motion of the controlling valve relatively thereto, said triple valve having a service position and a lap position, between which the controlling valve moves a given distance and the graduating valve moves a greater distance relatively to the slide valve, said graduating valve being shiftable from lap position, while the slide and controlling valves remain at rest to open and close a restricted service pasage in the slide valve.

2. A triple valve comprising in combination a triple piston; a slide valve; a quick service controlling valve; and a graduating valve, said valves being movable relatively to one another by motion of said triple piston, and said slide valve having a quick service passage which is opened and closed by the motion of the controlling valve relatively thereto, said triple valve having a lap position and two service application positions, in all of which the position of the slide valve remains substantially unchanged, and the service positions being differentiated by the rapidity of flow from the auxiliary reservoir to the brake cylinder, both such flows being graduated by the graduating valve and the controlling valve serving to open the quick service passage in one of said positions and close it in the other.

3. A triple valve comprising in combination a triple piston; a slide valve; a quick service controlling valve; a graduating valve, said valves being movable relatively to one another by motion of said triple piston, and said slide valve having a quick service passage which is opened and closed by the motion of the controlling valve relatively thereto; said triple valve having a lap position and two service application positions, in all of which the position of the slide valve remains substantially unchanged, and the service positions being differentiated by the rapidity of flow from the auxiliary reservoir to the brake cylinder, both such flows being graduated by the graduating valve and the controlling valve serving to open the quick service passage in one of said positions and close it in the other; and a pressure controlled quick service limiting valve controlling flow through said quick service passage and adapted to close in response to a definite reduction of brake pipe pressure, said limiting valve being controlled by the triple valve and restored to open condition by motion of the triple valve to lap position.

4. A triple valve comprising in combination a triple piston; a slide valve; a quick service controlling valve; a graduating valve, said valves being movable relatively to one another by motion of said triple piston, and said slide valve having a quick service passage which is opened and closed by the motion of the controlling valve relatively thereto; said triple valve having a lap position and two service application positions, in all of which the position of the slide valve remains substantially unchanged, and the service positions being differentiated by the rapidity of flow from the auxiliary reservoir to the brake cylinder, both such flows being graduated by the graduating valve and the controlling valve serving to open the quick service passage in one of said positions and close it in the other; a limiting valve controlling flow through the quick service passage; means biasing said valve in an opening direction; a movable abutment connected to actuate said valve and subject in opposite directions to brake pipe pressure and to pressure in a confining chamber; and means controlled by the triple valve and operative in lap and release positions to substantially equalize such pressure with auxiliary reservoir pressure.

5. A triple valve comprising in combination a triple piston; a slide valve; a quick service controlling valve; a graduating valve, said valves being movable relatively to one another by motion of said triple piston, and said slide valve having a quick service passage which is opened and closed by the motion of the controlling valve relatively thereto; said triple valve having a lap position and two service application positions, in all of which the position of the slide valve remains substantially unchanged, and the service positions being differentiated by the rapidity of flow from the auxiliary reservoir to the brake cylinder, both such flows being graduated by the graduating valve and the controlling valve serving to open the quick service passage in one of said positions and close it in the other; a limiting valve controlling flow through the quick service passage; means biasing said valve in an opening direction; a movable abutment connected to actuate said valve and subject in opposite directions to brake pipe pressure and to pressure in a confining chamber; and means controlled by the triple valve and operative in lap and release positions to substantially equalize such chamber pressure with auxiliary reservoir pressure, said means including ports in the slide and controlling valves which register in lap position.

6. A triple valve comprising in combination a triple piston; a slide valve; a quick service controlling valve; a graduating valve, said valves being movable relatively to one another by motion of said triple piston, and said slide valve having a quick service passage which is opened and closed by the motion of the controlling valve relatively thereto; said triple valve having a lap position and two service application positions, in all of which the position of the slide valve remains substantially unchanged, and the service positions being differentiated by the rapidity of flow from the auxiliary reservoir to the brake cylinder, both such flows being graduated by the graduating valve and the controlling valve serving to open the quick service passage in one of said positions and close it in the other; a limiting valve controlling flow through the quick service passage; means biasing said valve in an opening direction; a movable abutment connected to actuate said valve and subject in opposite directions to brake pipe pressure and to pressure in a confining chamber; and means controlled by the triple valve and operative in lap and release positions to substantially equalize such chamber pressure with auxiliary reservoir pressure, said means including ports in the slide and controlling valves which register in lap position, and ports in the slide and graduating valve which register in release position.

7. A triple valve comprising in combination, a triple piston; a slide valve; a controlling valve; and a graduating valve, said valves being movable by said piston with differential lost motion, the parts being so arranged that the controlling valve coacts with the slide valve to regulate quick service venting, and the graduating valve coacts with the slide valve to graduate service flow, a portion of said graduation occurring in a position in which the controlling valve closes the quick service port, and a portion of said graduating action occurring in a position in which said controlling valve opens said quick service port.

8. A triple valve comprising in combination a triple piston, a slide valve; a quick service controlling valve; and a service graduating valve, said valves being movable by said piston with differential lost motion, the slide valve being provided with a quick service passage controlled by the quick service controlling valve and with two service ports controlled by the graduating valve, the parts being so arranged that the graduating valve will graduate flow through one of the service ports while the quick service port is closed by the quick service controlling valve and will graduate flow through the other of said service ports while the quick service port is opened by said controlling valve.

9. A triple valve comprising in combination a triple piston, a slide valve; a quick service controlling valve; and a service graduating valve, said valves being movable by said piston with differential lost motion, the slide valve being provided with a quick service passage controlled by the quick service controlling valve and with two service ports controlled by the graduating valve, the parts being so arranged that the graduating valve will graduate flow through one of the service ports while the quick service port is closed by the quick service controlling valve and will graduate flow through the other of said service ports while the quick service port is opened by said controlling valve; and a pressure actuated quick service limiting valve responsive to a definite reduction of brake pipe pressure and serving to close against flow through said quick service passage when brake pipe pressure has been reduced through a definite range.

10. A triple valve comprising in combination a triple piston, a slide valve; a quick service controlling valve; and a service graduating valve, said valves being movable by said piston with differential lost motion, the slide valve being provided with a quick service passage controlled by the quick service controlling valve and with two service ports controlled by the graduating valve, the parts being so arranged that the graduating valve will graduate flow through one of the service ports while the quick service port is closed by the quick service controlling valve and will graduate flow through the other of said service ports while the quick service port is opened by said controlling valve; a pressure actuated quick service limiting valve responsive to a definite reduction of brake pipe pressure and serving to close against flow through said quick service passage when brake pipe pressure has been reduced through a definite range; and means controlled by the triple valve and effective in lap position thereof to cause said limiting valve to open and to condition the same for a second limiting function.

11. In a triple valve, the combination of a triple piston; a slide valve; a controlling valve; and a graduating valve, said three valves being actuated by the triple piston with differential lost motion, the graduating valve having a greater range of motion relatively to the slide valve than the controlling valve, said triple valve having a service position and a lap position, between which the slide valve is not shifted and the graduating valve and controlling valve shift differentially, said slide valve having two service ports, through the first of which a restricted flow is graduated by the graduating valve on initial motion from lap toward service position and before the controlling valve is shifted, and through the second of which flow is graduated by the graduating valve after the controlling valve is shifted.

12. In a triple valve, the combination of a triple piston; a slide valve; a quick service controlling valve; and a graduating valve actuated by said piston with differential lost motion, in such manner that as the piston reverses its motion first the graduating valve and then both the graduating and the controlling valves are shifted, said triple valve having a service position and a lap position, between which the slide valve does not shift, and the slide valve having a quick service port and a service port, each of which is then in operative position, the parts being so arranged that upon initial motion from lap toward service position motion of the graduating valve controls a restricted flow through such service port while the quick service port remains closed by the controlling valve, and upon further movement the controlling valve moves with the graduating valve and opens the quick service port as the graduating valve completes the opening of the service port.

13. The combination of a brake pipe, an auxiliary reservoir, a brake cylinder, a triple valve having a quick service vent which in quick service position of the triple valve vents the brake pipe; a second valve controlling flow through said vent; an abutment operatively connected with said second valve and subject to brake pipe pressure in a valve opening direction; means effective in release and lap positions of the triple valve for admitting auxiliary reservoir pressure against said abutment in a valve closing direction; and means for biasing said valve in an opening direction.

14. The combination of a brake pipe, an auxiliary reservoir, a brake cylinder, a triple valve having service, lap and release positions and having a quick service vent which as an incident to motion of the triple valve from release to service position vents the brake pipe; a second valve controlling such venting flow; a chamber connected by the triple valve with the auxiliary reservoir in lap and release positions and disconnected therefrom in service position; an abutment operatively connected with said second valve and subject in a valve opening direction to brake pipe pressure and in a valve closing direction to pressure in said chamber; and means for biasing said second valve in an opening direction.

15. The combination of claim 14, further characterized in that the brake pipe venting flow is to atmosphere.

16. The combination of claim 14, further characterized in that the venting flow is to the exhaust port of the brake cylinder and said exhaust port is controlled by a retainer.

17. The combination of a triple valve having a quick service vent open in service position of the triple valve; a quick service limiting valve having an opening tendency and urged in an opening direction by brake pipe pressure and in a closing direction by a confined pressure; and means effective in lap and release positions of the triple valve for substantially equalizing said confined pressure with brake pipe pressure.

18. The combination of a stabilizing chamber; a triple valve including a brake pipe connection, an auxiliary reservoir connection, and a brake cylinder connection, and having a release position in which it vents said chamber, a service position, and a lap position in which it connects said brake pipe with said chamber; delay valve means controlling flow to the brake cylinder in service; means actuated at least in part by pressure in said chamber arranged to shift said valve to restricting position when said chamber is uncharged and to non-restricting position when it is charged; and means responsive to the pressure to which the system is charged in release position and serving when this pressure is high to suspend the restricting action of said delay valve.

19. The combination of a stabilizing chamber, a triple valve including a brake pipe connection, an auxiliary reservoir connection and a brake cylinder connection, and having a release position in which it vents said chamber, a service position, and a lap position in which it connects said brake pipe with said chamber; a delay valve means controlling flow to the brake cylinder in service position; means including an abutment subject to the opposing pressures in said chamber and in the auxiliary reservoir arranged to shift said delay valve means to flow restricting position when said chamber is uncharged and to non-restricting position when it is charged; and means responsive to the pressure to which the system is charged in release position, and serving when said pressure is high to suspend the restricting action of said delay valve means.

20. The combination of a stabilizing chamber; a triple valve including a brake pipe connection, an auxiliary reservoir connection, a supplemental reservoir connection, and a brake cylinder connection, said triple valve having a release position in which it vents said chamber, a service position, and a lap position in which it connects said brake pipe with said chamber; delay valve means controlling flow to the brake cylinder in service position; yielding means urging said delay valve means toward flow restricting position; and two means for suspending the delaying action thereof, one responsive to the establishment of pressure in said chamber, and the other responsive to pressure in the supplemental reservoir.

21. The combination of a stabilizing chamber; a triple valve including a brake pipe connection, an auxiliary reservoir connection, a supplemental reservoir connection, and a brake cylinder connection, said triple valve having a release position in which it vents said chamber, a service position, and a lap position in which it connects said brake pipe with said chamber; two valves arranged in parallel to control flow to the brake cylinder in service, one valve having a non-restricting position and a restricting position, and the other valve having a non-restricting position and a flow interrupting position; yielding means urging said valves away from their non-restricting positions; means operable by the establishment of pressure in said chamber to shift the first valve to non-restricting position; and means responsive to a definite pressure in the supplemental reservoir to shift the second valve to non-restricting position.

22. A triple valve comprising in combination a triple piston; a slide valve; a quick service controlling valve and a graduating valve, said valves being movable relatively to one another by motion of said triple piston, and said slide valve having a quick service passage which is opened and closed by the motion of the controlling valve relatively thereto; said triple valve having a lap position and two service application positions, in all of which the position of the slide valve remains substantially unchanged, and the service positions being differentiated by the rapidity of flow from the auxiliary reservoir to the brake cylinder, both such flows being graduated by the graduating valve and the controlling valve serving to open the quick service passage in one of said positions and close it in the other; and a pressure controlled quick service limiting valve controlling flow through said quick service passage and adapted to close in response to a definite reduction of brake pipe pressure.

23. A triple valve including a triple piston; a yielding retard stop coacting therewith; a slide valve; a quick service controlling valve coacting with the slide valve; a graduating valve coacting with the slide valve, said valves being shiftable with differential lost motion by the piston, said slide valve having a quick service passage which is opened and closed by the motion of the controlling valve relatively thereto, and a stabilizing passage and a service passage which are opened and closed by the motion of the graduating valve relatively thereto, said triple valve having a normal and a restricted recharge position, a service position and a lap position, the stabilizing passage being opened by the graduating valve to connect brake pipe and auxiliary reservoir when the retard stop restores the piston and graduating valve after the triple valve has moved to restricted recharge position, and the slide valve remaining substantially at rest in service and lap positions, the controlling valve functioning to control the quick service passage, during a portion only of the graduating motion of the graduating valve relatively to the slide valve.

24. A triple valve comprising in combination, a triple piston; a yielding retard stop coacting therewith; a slide valve; a controlling valve; and a graduating valve, said valves being movable by said piston with differential lost motion, the graduating valve having the least lost motion, the parts being so arranged that the controlling valve coacts with the slide valve to control quick service venting, the graduating valve coacts with the slide valve to graduate service flow, a portion only of said graduation occurring while said venting takes place and said graduating valve coacts with said slide valve to establish a stabilizing connection between brake pipe and auxiliary reservoir when the piston and graduating valve are shifted by said retard stop.

CHARLES A. CAMPBELL.